Oct. 9, 1928.  
W. R. HIGHT  
1,686,524  
GYROSCOPIC COMPASS  
Filed Nov. 7, 1925

INVENTOR  
William R. Hight.  
BY  
Herbert H. Thompson  
his ATTORNEY

Patented Oct. 9, 1928.

1,686,524

UNITED STATES PATENT OFFICE.

WILLIAM R. HIGHT, OF HOLLIS, NEW YORK, ASSIGNOR TO THE SPERRY GYROSCOPE COMPANY, OF NEW YORK, N. Y., A CORPORATION OF NEW YORK.

GYROSCOPIC COMPASS.

Application filed November 7, 1925. Serial No. 67,625.

This invention relates to gyroscopic compasses in which means are employed to eliminate the error or oscillation otherwise set up when the ship on which the compass is mounted accelerates or turns. It has been found that oscillations are set up at this time by the damping factor of the compass and to overcome this it has been proposed to eliminate or greatly reduce the damping during this time. I have found, however, that the elimination of the damping, while it lessens such oscillations, does not entirely eliminate them unless further and other means are employed in connection therewith.

It has long been known that the period of a gyroscopic compass has a vital relation to the proper behavior thereof on turning or acceleration of the ship, and it has been found that a period of about 85 minutes is the most satisfactory. I have found, however, that even though a compass be designed for this period that when the damping is eliminated, oscillations are still present, and I have determined that one cause of such oscillations is the fact that the elimination of the damping results in a shortening of the period of the compass by some 10 to 12 minutes, depending on the damping factor employed. The result is that when the ship turns or accelerates the compass does not reach the new settling points at the same time that the acceleration ceases, resulting in the setting up of an oscillation.

It is one of the objects of this invention to avoid the aforementioned difficulty and to devise a compass which will be unaffected by acceleration or turning of the ship by reason of the elimination of the damping at that time by imparting to the compass the proper period at that time.

Figure 1:
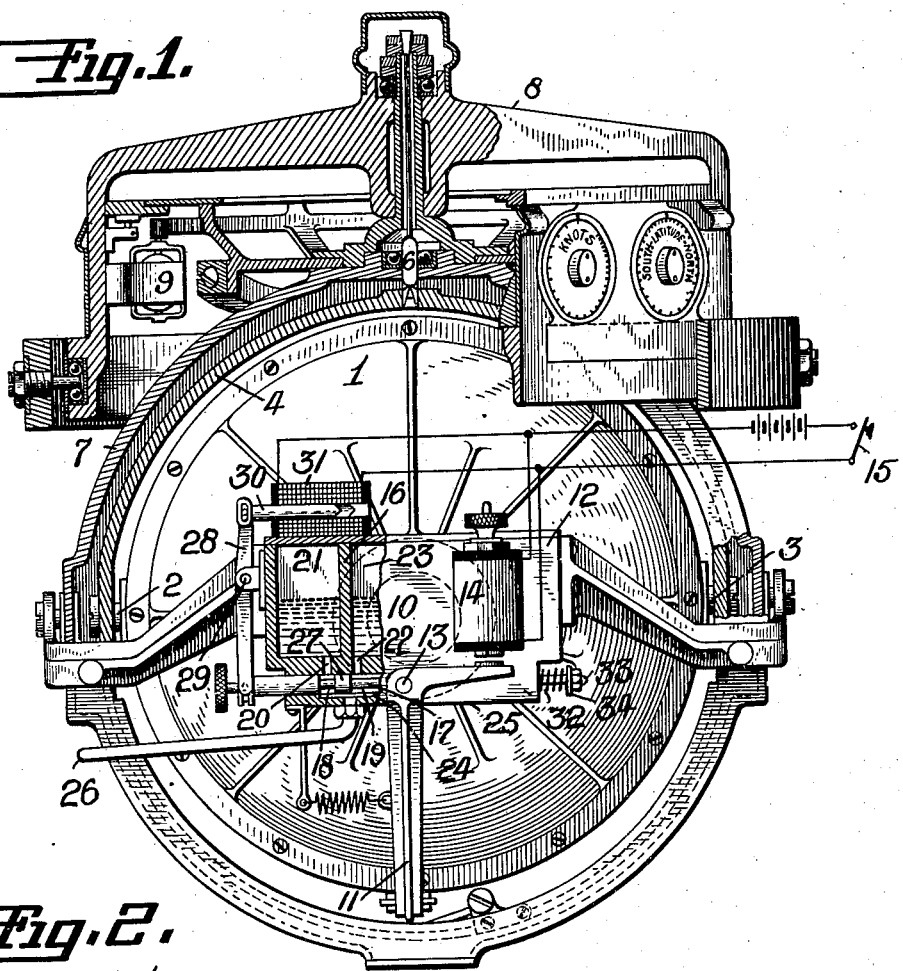

Referring to the drawings in which what I now consider the preferred forms of my invention are shown Fig. 1 is a south elevation of the compass, partly in section, embodying my invention.

Figure 2:
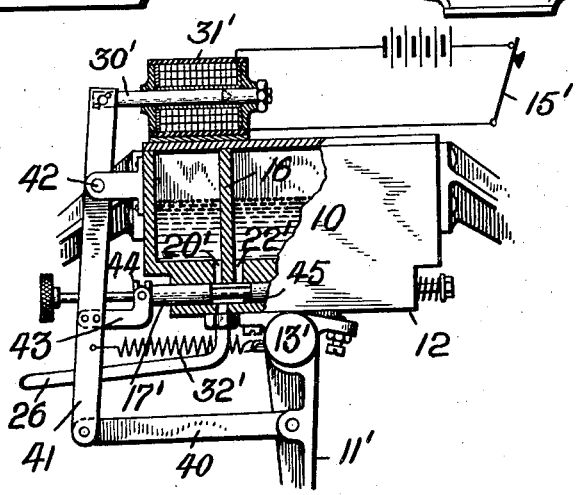

Fig. 2 is a detail, partly in section, of a modified form of the invention.

To illustrate my invention, I have shown it applied to the Sperry type compass employing a liquid control system and have shown the damping as being eliminated by the method disclosed in the co-pending application of Herbert H. Thompson, Serial No. 436,900, filed January 13, 1921. It will be obvious, however, that my invention may be applied to other forms of compasses and other types of damping eliminators without departing from the spirit of the invention as defined in the appended claims.

The casing of the gyroscope proper is shown at 1, the same being mounted for oscillation about a horizontal axis 2—3 in the vertical ring 4. Said ring in turn is journaled for turning about a vertical axis by top bearing 6 and the bottom bearing (not shown) in the follow-up ring 7, which in turn is journaled for rotation within the spider 8. The follow-up ring is driven in the usual manner by the follow-up motor 9. Pivoted on the follow-up ring is the usual liquid control gravitational system or factor 10 by which the north seeking property is imparted to the compass. Said system is shown as connected to the bottom of the case by an arm 11, normally connected to the case at a point slightly eccentric to the vertical line through the center thereof, by which the damping factor is introduced in a manner well understood in the art. Said arm is pivoted on the box 12 at 13 so that the eccentricity of the connection may be varied or eliminated at will. An electro-magnet 14 is shown for substantially eliminating or greatly reducing the eccentricity of the connection and thereby the damping, so that when said electro-magnet is excited the arm 11 is rotated counterclockwise through a small angle, thereby moving it to a position where the connection of the same with the case is directly under the center of the gyro. The electro-magnet is controlled by any suitable means which may be actuated when the ship turns or accelerates. This is illustrated conventionally by a hand-operating switch 15, but it will be understood that any means, automatic or manual, may be used to operate said switch whenever the ship changes its speed or course. For securing the proper period of the compass I may do either one of two things. First I may design the compass so that its period, when damped, is longer than the normal 85 minute period so that when the damping is eliminated its period will be equal to the 85 minutes required, or, second, I may design the compass so as to have at all times the proper period by varying said period at the same time that the damping is eliminated.

One form that the mechanism may assume for effecting this purpose is as follows: Each of the containers or boxes 12 for the mercury, located on either side of the compass, may be divided by a partition 16 and means provided whereby the amount of liquid flowing between the boxes is varied by cutting off a portion of the liquid to one side of the partition. To effect this I have shown a slidable valve 17 having cut-away sections 18 and 19 normally in communication respectively with the port 20 leading to the part 21 to the left of the partition 16, and with port 22 leading to the portion 23 of the box to the right of the partition.

A channel 24 is provided in the casing 25 for the valve so that in this condition the mercury in both boxes is free to flow through the pipe 26 connecting the containers. When, however, the valve is moved to the left in Fig. 1, port 20 is closed by the enlarged portion 27 of said valve, thereby cutting off the mercury in compartment 21. The movement of the valve is shown as effected by a lever 28 pivoted at 29 on the box 12 and connected at its upper end to the armature 30 of the solenoid 31. The solenoid is normally maintained in the position shown in the figure by means of spring 32 located on an extension or stem 33 of the valve and between the box 12 and the collar 34 on said stem. When, however, the solenoid is excited, the armature is drawn inwardly thereby moving the valve to the left as explained. Preferably the solenoid is placed in the same electrical circuit with the magnet 14 so that the movement of the valve occurs simultaneously with the elimination of the damping. The movement of the valve results in lessening the effective area of the mercury operating on the compass by cutting off a portion thereof, thereby resulting in a lengthening of the period at this time by the reduction of the gravitational factor. It will be understood that valve 17, together with the actuating mechanism therefor, is duplicated on the other side of the compass.

An alternative system for effecting the above is shown in Fig. 2 in which both functions are accomplished by a single solenoid. In this figure the eccentric arm 11' is shown as pivoted to the bottom of the container 12 at 13' and the movement thereof is effected by means of a link 40 connected to lever 41 pivoted at 42 and pinned at its upper end to the core 30' of the solenoid 31'. Said lever 41 is also connected to the valve 17' by means of a forked-arm 43, the fork thereof taking around a collar 44 on the valve. The valve in this instance works oppositely to the valve above described in that it shuts off one compartment when moved to the right instead of to the left, and in this instance also the solenoid 31' is normally excited, that is, when damping is present, and is deenergized when the ship accelerates or turns. It would be understood, therefore, that the switch 15' is manipulated oppositely to switch 15. In other words, switch 15' is closed when switch 15 is opened and vice versa. When the solenoid is energized, therefore, the core 30' is drawn to the right thereby maintaining the valve 17' to the left against the action of the spring 32' and also maintaining the arm 11' to the left in its damping position. At this time the cut-away portion 45 of said valve extends across both ports 20' and 22' so that all the mercury is free to flow through pipe 26. When, however, the solenoid 31' is deenergized, the core moves to the left by the action of the spring and the valve moves to the right closing the port 20' and moving at the same time the arm 11' counterclockwise to eliminate the damping.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro-compass having a damping factor, of means for substantially eliminating the damping, and means for giving the compass substantially an 85 minute period while the damping is eliminated.

2. In a gyro-compass having a damping factor, of means for reducing the damping, thereby tending to shorten the period of the compass, and means for preventing the period of the compass from shortening while the damping is reduced.

3. In a gyro-compass, means for varying the period thereof by altering the effective gravitational factor, and means for operating said first-named means to lengthen the period when the ship turns or accelerates.

4. In a gyro-compass having a damping factor and a gravitational factor, of means for reducing the damping factor, and means brought into action by said first named means for also lessening the gravitational factor.

5. In a gyro-compass having a damping factor and a gravitational factor, of a common means for substantially eliminating the damping and lessening said gravitational factor.

6. In a gyro-compass, a liquid control gravitational factor therefor, comprising a plurality of liquid containers on each side of the gyroscope and connected by a communicating means, electro-mechanical means for varying the number of containers on each side of the compass which are in communication with the containers on the other side thereof and means whereby said first-named means may be actuated when the ship turns.

7. In a gyro-compass, a liquid control gravitational factor therefor, comprising a liquid container on each side of the gyroscope and connected by communicating means, electro-mechanical means for varying the effective area of each container which is in communication with the other container, and means whereby said electro-mechanical means may be actuated when the ship turns.

8. In a gyro-compass, a liquid control gravitational factor therefor, comprising a liquid container on each side of the gyroscope and connected by communicating means, a normally eccentric connection between said containers and the gyroscope, electro-mechanical means for varying the effective area of each container which is in communication with the other container and for simultaneously varying the eccentricity of said connection, and means whereby said electro-mechanical means may be actuated when the ship turns.

In testimony whereof I have affixed my signature.

WILLIAM R. HIGHT.